US010088390B2

(12) United States Patent
Xu et al.

(10) Patent No.: US 10,088,390 B2
(45) Date of Patent: Oct. 2, 2018

(54) MULTIFUNCTIONAL COMPREHENSIVE TESTING MACHINE FOR A LUGGAGE LOCK

(71) Applicant: Dongguan Jingyu Industrial Co., Ltd., Dongguan (CN)

(72) Inventors: Zheng Xu, Dongguan (CN); Xiangshou Zeng, Dongguan (CN); Maotian He, Dongguan (CN)

(73) Assignee: Dongguan Jingyu Industrial Co., Ltd., Dongguan (CN)

( * ) Notice: Subject to any disclaimer, the term of this patent is extended or adjusted under 35 U.S.C. 154(b) by 0 days.

(21) Appl. No.: 15/578,887

(22) PCT Filed: Mar. 13, 2015

(86) PCT No.: PCT/CN2015/074169
§ 371 (c)(1),
(2) Date: Dec. 1, 2017

(87) PCT Pub. No.: WO2016/106975
PCT Pub. Date: Jul. 7, 2016

(65) Prior Publication Data
US 2018/0136086 A1    May 17, 2018

(30) Foreign Application Priority Data

Dec. 30, 2014 (CN) .......................... 2014 1 0851661

(51) Int. Cl.
*G01M 99/00* (2011.01)
*G05B 19/04* (2006.01)
(Continued)

(52) U.S. Cl.
CPC .......... *G01M 99/008* (2013.01); *G01M 13/00* (2013.01); *A45C 13/00* (2013.01);
(Continued)

(58) Field of Classification Search
CPC .... G01D 21/00; G01M 99/008; G01M 13/00; G05B 19/05; G05B 2219/24015;
(Continued)

(56) References Cited

FOREIGN PATENT DOCUMENTS

| CN | 2826401 Y | 10/2006 |
|---|---|---|
| CN | 101587013 A | 11/2009 |

(Continued)

*Primary Examiner* — Randy Gibson
*Assistant Examiner* — Gedeon M Kidanu
(74) *Attorney, Agent, or Firm* — Zhihua Han; Le Tian

(57) ABSTRACT

The invention relates to a multifunctional comprehensive testing machine for a luggage lock. The multifunctional comprehensive testing machine includes a testing machine table and a control unit, wherein a luggage lock fixing clamp, a push button and zipper hook piece testing mechanism, an elastic zipper sheet testing mechanism and a number-changing key testing mechanism are installed on a working table top of the testing machine table; and the control unit includes a Programmable Logic Controller (PLC) arranged in the testing machine table, a touch display screen and a start-stop switch, the touch display screen and the start-stop switch being installed on the side of the machine table, and an alarm lamp being arranged on the side of the machine table.

7 Claims, 4 Drawing Sheets

(51) Int. Cl.
*G01M 13/00* (2006.01)
*A45C 13/00* (2006.01)
*G05B 19/05* (2006.01)

(52) U.S. Cl.
CPC .............. *G05B 19/04* (2013.01); *G05B 19/05* (2013.01); *G05B 2219/24015* (2013.01)

(58) Field of Classification Search
CPC .... A45C 1/00; A45C 7/00; A45C 3/00; A45C 5/00; A45C 9/00; A45C 11/00; A45C 13/00; A45C 13/10; A45C 13/18; A45C 13/262; A45C 15/00; A45C 15/06; A45C 2005/037; A45C 2013/267; A45C 5/03; A45C 5/146; A45C 13/42; A47C 17/82
See application file for complete search history.

(56) References Cited

FOREIGN PATENT DOCUMENTS

| | | | |
|---|---|---|---|
| CN | 201497639 U | * | 6/2010 |
| CN | 201983925 U | | 9/2011 |
| CN | 204330313 | | 9/2011 |
| CN | 103411768 A | | 11/2013 |
| JP | 2009294085 A | | 12/2009 |
| WO | WO2004001166 A1 | | 12/2003 |

* cited by examiner

MULTIFUNCTIONAL COMPREHENSIVE TESTING MACHINE FOR A LUGGAGE LOCK

FIELD OF THE INVENTION

The invention relates to the technical field of coded locks, and in particular to a multifunctional comprehensive testing machine for a luggage lock.

BACKGROUND OF THE INVENTION

Currently, the service life of a push button of a luggage lock, an elastic zipper sheet, the sliding friction of a zipper hook piece, and a number-changing key are mainly tested by a worker in a manual manner. The testing mode is very low in efficiency and accuracy, and high in labour cost.

SUMMARY OF THE INVENTION

The invention provides a multifunctional comprehensive testing machine for a luggage lock, which is intended to overcome the defects in the traditional art.

To this end, the technical solutions adopted in the invention are implemented as follows. A multifunctional comprehensive testing machine for a luggage lock may include a testing machine table and a control unit, wherein a luggage lock fixing clamp, a push button and zipper hook piece testing mechanism, an elastic zipper sheet testing mechanism and a number-changing key testing mechanism may be installed on a working table top of the testing machine table.

The push button and zipper hook piece testing mechanism may include an installation base plate, a motor, a cam driven by the motor, guide rods driven by a curved surface of the cam and a push button poking block installed at the tail ends of the guide rods, wherein the motor, the cam, the guide rods and the push button poking block may be installed on the installation base plate, the guide rods may be installed on a guide rod seat, and a guide rod return spring may be arranged at the periphery of each guide rod.

The elastic zipper sheet testing mechanism may include a first installation support, wherein a first electric push rod and a vertical sliding rail may be vertically installed on the first installation support; a sliding block may be installed on the vertical sliding rail; an output end of the first electric push rod may directly face an upper surface of the sliding block; a sliding block return spring may be arranged between the upper part of the sliding block and the installation support; and a zipper head locating block may be installed on the sliding block.

The number-changing key testing mechanism may include a second installation support and a second electric push rod installed thereon, an output end of the electric push rod being connected to a number-changing key ejector pin.

The push button and zipper hook piece testing mechanism may include two push rods, a front guide rod connecting block and a rear guide rod connecting block being arranged at the front and rear ends of the two guide rods respectively, a roller being connected to the front guide rod connecting block, and the roller of the front guide rod connecting block being in contact with the cam. The push button poking block may be installed on the rear guide rod connecting block.

The testing machine may further include a push button return sensor, a sliding block return sensor, an elastic zipper sheet return sensor and a number-changing key return sensor connected to the control unit.

A stroke switch may be arranged beside the guide rods.

The control unit may include a Programmable Logic Controller (PLC) arranged in the testing machine table, a touch display screen and a start-stop switch, the touch display screen and the start-stop switch being installed on the side of the machine table. An alarm lamp may be arranged on the side of the machine table.

Two strip-shaped grooves configured to install zipper heads may be provided on the zipper head locating block of the elastic zipper sheet testing mechanism.

A plurality of fixing holes may be provided on the working table top of the testing machine table.

The invention has the following advantages: a manual testing mode of a worker can be replaced with the comprehensive testing machine, thereby greatly improving the testing efficiency and the testing accuracy; meanwhile, testing of four functions including the service life of a push button, the elasticity and service life of an elastic zipper sheet, the sliding friction of a zipper hook piece and the service life of a number-changing key is creatively completed on one device, simulation of the working sequence and principle of the luggage lock under the using condition controlled by the PLC is achieved, and a completely-intelligent requirement is met.

DETAILED DESCRIPTION OF THE PREFERRED EMBODIMENTS

The invention is further described below with reference to the embodiments and the drawings.

Figure 1:
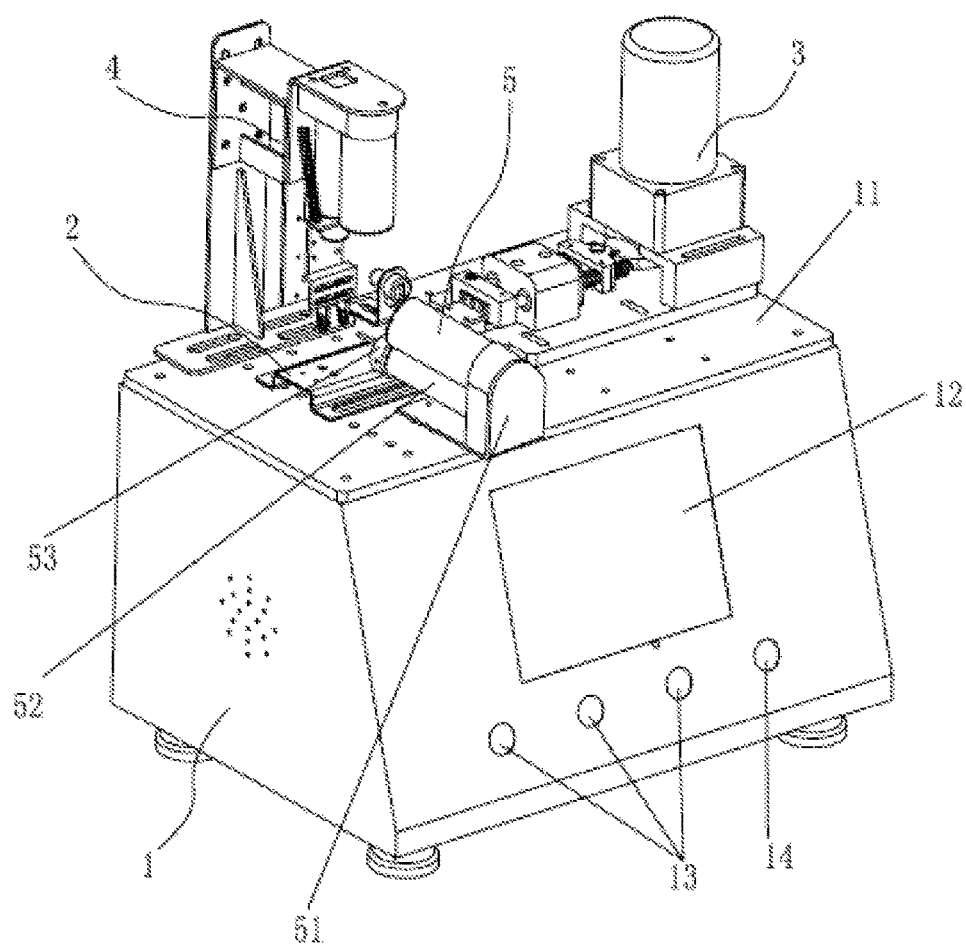
FIG. 1 is an overall structure diagram of a testing machine according to the invention.
Figure 2:
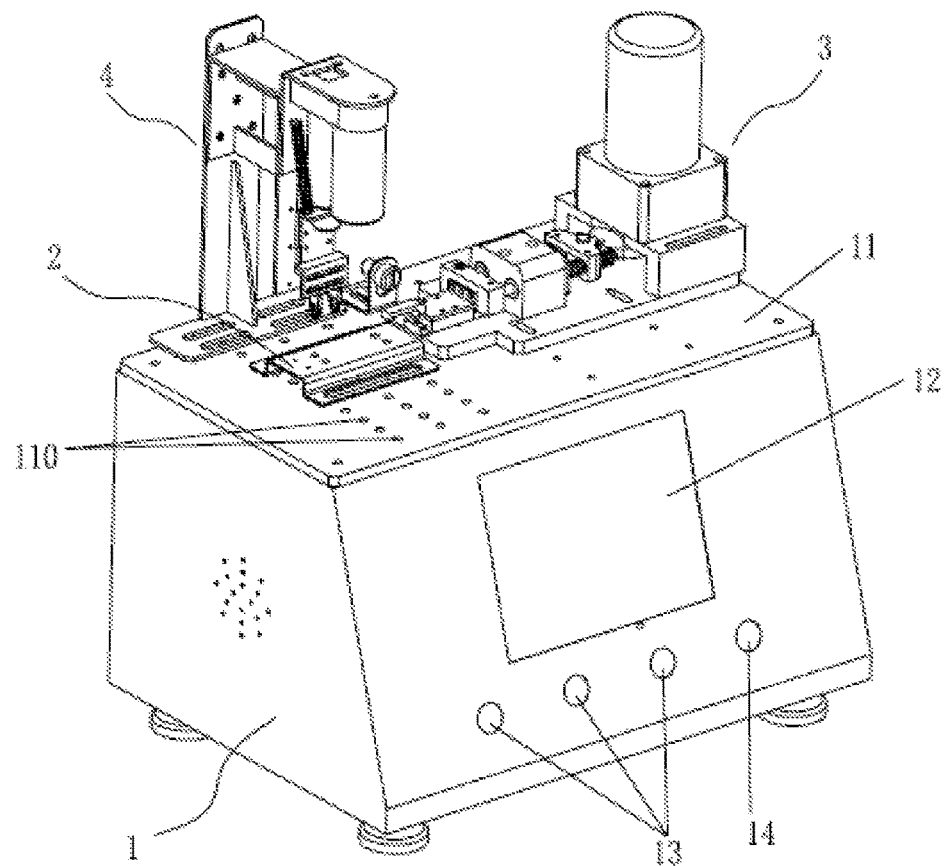
FIG. 2 is a structure diagram of a testing mechanism from which a number-changing key is removed.
Figure 3:
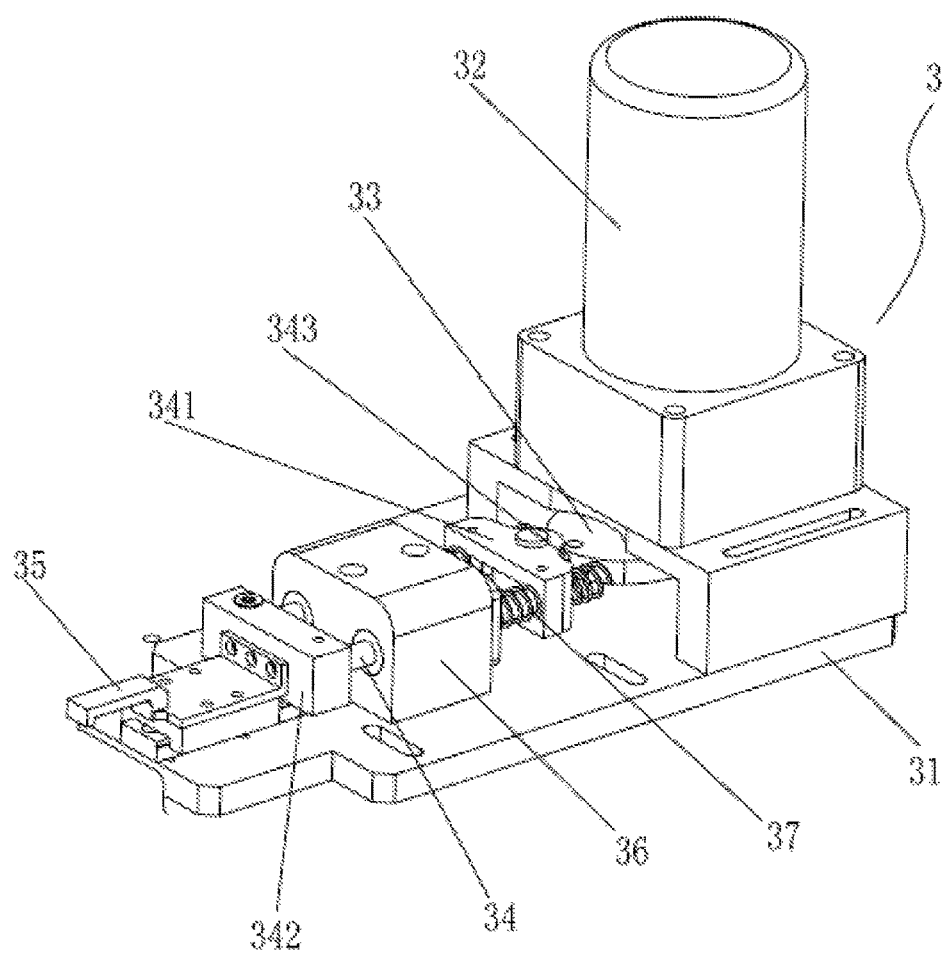
FIG. 3 is a local structure diagram of a push button and zipper hook piece testing mechanism.
Figure 4:
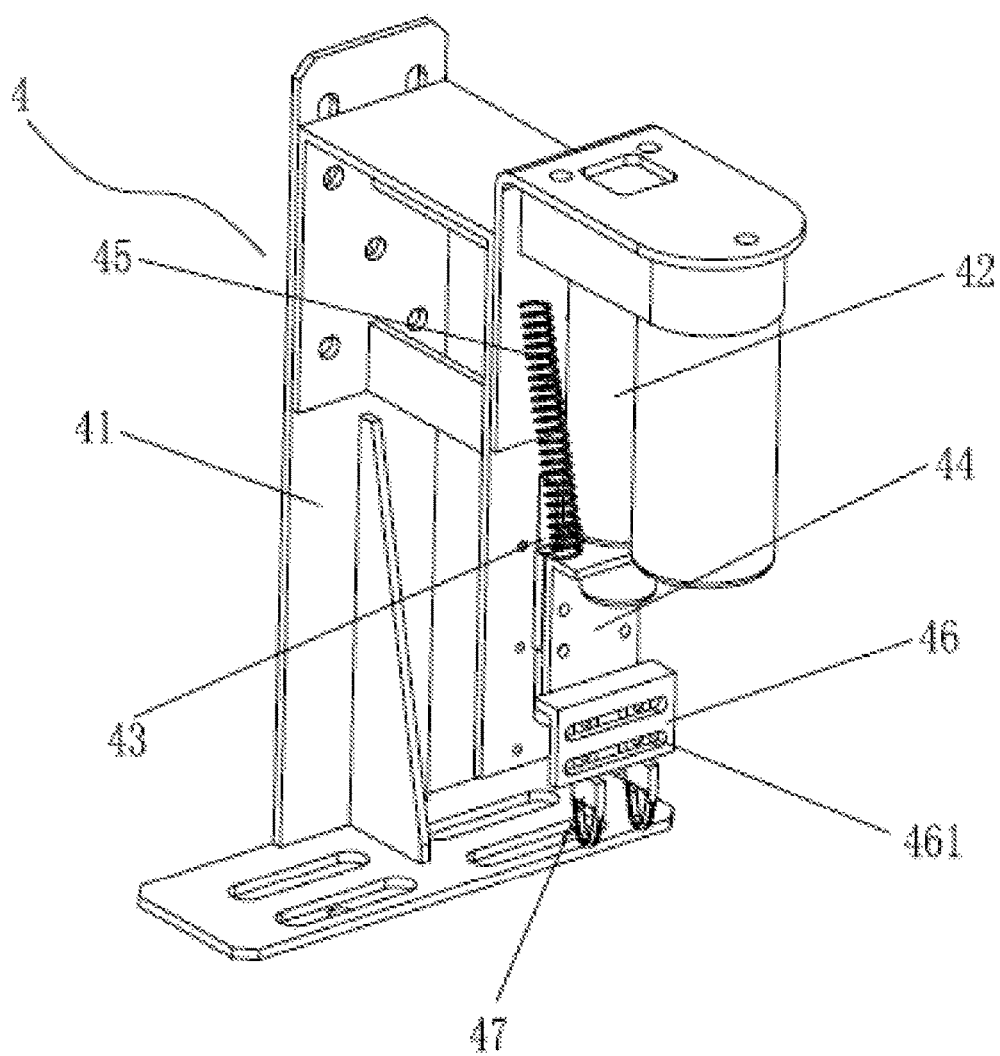
FIG. 4 is a local structure diagram of an elastic zipper sheet testing mechanism.

As shown in FIG. 1 to FIG. 4, a multifunctional comprehensive testing machine for a luggage lock includes a testing machine table 1 and a control unit, wherein a luggage lock fixing clamp 2, a push button and zipper hook piece testing mechanism 3, an elastic zipper sheet testing mechanism 4 and a number-changing key testing mechanism 5 are installed on a working table top 11 of the testing machine table 1.

The push button and zipper hook piece testing mechanism 3 includes an installation base plate 31, a motor 32, a cam 33 driven by the motor 32, guide rods 34 driven by a curved surface of the cam 33 and a push button poking block 35 installed at the tail ends of the guide rods 34, wherein the motor 32, the cam 33, the guide rods 34 and the push button poking block 35 are installed on the installation base plate 31, the guide rods 34 are installed on a guide rod seat 36, and a guide rod return spring 37 is arranged at the periphery of each guide rod 34; after the push button and zipper hook piece testing mechanism 3 is installed, the push button poking block 35 thereon is aligned with or is in contact with an unlocking push button of a luggage lock fixed to the luggage lock fixing clamp 2; in the embodiment, the push button and zipper hook piece testing mechanism 3 includes two push rods 34, a front guide rod connecting block 341 and a rear guide rod connecting block 342 are arranged at the front and rear ends of the two guide rods 34 respectively, a roller 343 is connected to the front guide rod connecting block 341, and the roller 343 of the front guide rod connecting block 341 is in contact with the cam 33; and the push button poking block 35 is installed on the rear guide rod connecting block 342. The roller 343 of the front guide rod connecting block 341 is in contact with the cam 33, thereby reducing the friction and making the transmission more effective and more energy-efficient. Each guide rod return spring 37 is arranged among the periphery of the corresponding guide rod 34, the front guide rod connecting block 341 at the front ends of the guide rods and the guide rod seat 36. By means of the elastic force of the guide rod return springs 37, the roller 343 at the front ends of the guide rods 34 and the curved surface of the cam 33 keep linked constantly, so that the guide rods 34 are driven by the cam 33 to rectilinearly reciprocate along the guide rod seat 36. Furthermore, in order to ensure the sliding stability of the push button poking block 35, a sliding block guide rail mechanism is arranged thereunder.

A movement mode of the push button and zipper hook piece testing mechanism 3 is as follows. When the cam 33 is driven by the motor 32 to rotate, the cam 33 pushes the guide rods 34 to move forward along the guide rod seat 36 via the front guide rod connecting block 341 with the increase of a radius of a contact between the cam 33 and the roller 343, and the push button poking block 35 will poke the unlocking push button on the luggage lock; otherwise, with the decrease of the radius of the contact between the cam 33 and the roller 343, the guide rods return under the action of the guide rod return springs 37 and drive the push button poking block 35 to return, and the unlocking push button on the luggage lock returns under the action of a return spring therein or a zipper hook piece return spring; the service lives of a push button and a zipper hook piece can be tested in such a repeated way; and when the cam 33 or a rotary shaft of the motor 22 rotates for a circle, one-time testing is completed, and the control unit counts for one time.

The elastic zipper sheet testing mechanism 4 includes a first installation support 41, wherein a first electric push rod 42 and a vertical sliding rail 43 are vertically installed on the first installation support 41; a sliding block 44 is installed on the vertical sliding rail 43, and a sliding block return spring 45 is further arranged between the upper part of the sliding block 44 and the first installation support 41; a zipper head locating block 46 is installed on the sliding block 44; an output end of the first electric push rod 42 directly faces an upper surface of the sliding block 44 or the zipper head locating block 46; two zipper heads 47 are installed on the zipper head locating block 46; holes of the zipper heads 47 are downward and directly face the position of a lock catch hole of the luggage lock on the luggage lock fixing clamp 2; when the output end of the first electric push rod 42 moves downward, the sliding block 44 on the vertical sliding rail 43 is pushed to slide downward, so that the zipper head locating block 46 on the sliding block 44 drives the zipper heads 47 to move downward, to be inserted into the lock catch hole of the luggage lock, to be buckled with a zipper hook piece and to press down an elastic zipper sheet in the luggage lock; then the first electric push rod 42 automatically returns; when the push button poking block 35 of the push button and zipper hook piece testing mechanism 3 pushes the unlocking push button, the zipper hook piece is disengaged from the zipper heads, and at this time, the sliding block 44 moves upward under the action of the sliding block return spring 45, so that the zipper heads return to a high position, and the elastic zipper sheet is restored; and one-time testing on the elastic zipper sheet is completed, and the service life of the elastic zipper sheet is tested by means of this testing.

The number-changing key testing mechanism 5 includes a second installation support 51 and a second electric push rod 52 installed thereon, an output end of the electric push rod 52 being connected to a number-changing key ejector pin 53; the position of the number-changing key ejector pin 53 directly faces the position of a number-changing key of the luggage lock fixed to the luggage lock fixing clamp 2; during testing, when the zipper heads 47 on the elastic zipper sheet testing mechanism 4 are inserted into the lock catch hole of the luggage lock, it is shown that a luggage is under a locked state; as a password is correct, the number-changing key ejector pin 53 can be driven by the second electric push rod 52 to push the number-changing key inward, and the second electric push rod 52 automatically returns thereafter; and then, after the push button poking block 35 of the push button and zipper hook piece testing mechanism 3 pushes the unlocking push button, the number-changing key will be ejected to return, one-time testing on the number-changing key is completed by means of the cooperation, and the service life of the number-changing key can be tested.

The testing machine further includes a push button return sensor, a sliding block return sensor, an elastic zipper sheet return sensor and a number-changing key return sensor connected to the control unit. Namely, each sensor is configured to sense whether the unlocking push button, the zipper hook piece, the elastic zipper sheet and the number-changing key in the tested luggage lock normally return in a testing process. If a certain component does not normally return, for example, the push button does not return, the zipper hook piece cannot be opened, the elastic force of the elastic zipper sheet is weakened or disappears, and the number-changing key cannot spring up or cannot normally return and cannot normally operate due to other reasons, a tested product is regarded as a deficient product, an alarm is given to shut the device down, and testing is ended. All parameters indicating a deficient product can be accurately adjusted. For example, when the push button cannot return to an initial position and returns for 5 mm generally, if this setting parameter is not reached, an alarm is given (namely, if the return stroke of the push button is smaller than 5 mm, an alarm is given); the elastic zipper sheet cannot allow the zipper heads to spring up for a certain height which is set as 20 mm generally, and if this setting parameter is not reached, an alarm is given (namely, if the spring-up height of the zipper heads is smaller than 20 mm, an alarm is given); and the number-changing key cannot return to an initial position and returns for 2.5 mm generally, if this setting parameter is not reached, an alarm is given (namely, if the return stroke of the number-changing key is smaller than 2.5 mm, an alarm is given). Every time an alarm is given, the machine stops operating, and an alarm number is displayed so as to provide convenience in inspection for a user.

A stroke switch is arranged beside the guide rods. A detection period is formed by the movement of the stroke switch and the guide rods. Namely, a detection period is a time interval at which the guide rods trigger the stroke switch twice. The program includes the steps as follows sequentially. (1) The guide rods move to trigger the stroke switch, the motor stops one second later, a period within which the push button is pushed or pulled and then loosened is completed at the same time, and the program enters the second step under the control of a PLC. (2) The PLC triggers a relay so as to open a press-down mechanism for the elastic zipper sheet, the relay is turned off immediately after the elastic zipper sheet is pressed down, the press-down mechanism for the elastic zipper sheet lifts at this time, and the zipper heads are retained in a lock hook of the luggage lock.

(3) The PLC triggers a relay for a number-changing key ejection mechanism, and the number-changing key ejection mechanism ejects the number-changing key forward, returns, and then pushes the number-changing key into the lock. (4) Then, the PLC triggers and controls the motor to be started so as to complete pushing or pulling of the push button, the zipper heads and the number-changing key are loosened at the same time, and the stroke switch is triggered to complete a program period.

The control unit includes a PLC (located inside and not shown in Figure) arranged in the testing machine table, a touch display screen 12 and a start-stop switch 13, the touch display screen 12 and the start-stop switch 13 being installed on the side of the machine table. An alarm lamp 14 is arranged on the side of the machine table.

Two strip-shaped grooves 461 configured to install the zipper heads 47 are provided on the zipper head locating block 46 of the elastic zipper sheet testing mechanism 4. The zipper heads 47 are fixed by the step-shaped grooves 461 and bolts, and the positions and models of the zipper heads 47 can be slightly adjusted according to the position and model of the luggage lock, thereby making the zipper heads correspond to the luggage lock.

A plurality of fixing holes 110 are provided on the working table top 11 of the testing machine table. These fixing holes 110 are configured to install the luggage lock fixing clamp 2 and all testing mechanisms. Providing of a great number of fixing holes 110 is intended to meet testing requirements of various luggage locks and to facilitate adjustment of the fixing clamp and the positions of the testing mechanisms.

The entire testing process is as follows. Firstly, a luggage lock is fixed to a luggage lock fixing clamp. Then, the positions of all testing mechanisms and the shapes of zipper heads and a push button push block are adjusted according to the position and model of the luggage box, thereby making it meet requirements. And then, a power supply is turned on, the number of times for testing is set by a touch screen, and a start switch is pressed down to start operating.

A motor of a push button and zipper hook piece testing mechanism rotates to drive a cam to rotate and drives guide rods and a push button poking block to push an unlocking push button, it is determined whether the unlocking push button can be pushed (namely it is determined whether a password is correct, and the entire testing needs to be performed when the password is correct), and if not, the operation is stopped. If the password is correct, testing is started. Firstly, a first electric push rod of an elastic zipper sheet testing mechanism drives the zipper heads to be inserted, downward, into a lock catch hole of the luggage lock and to be buckled with a zipper hook piece, an elastic zipper sheet is pressed down, and a second electric push rod returns; meanwhile, after the second electric push rod of a number-changing key testing mechanism drives a number-changing key ejector pin to push a number-changing key in the luggage lock inward, the second electric push rod and the number-changing key ejector pin return; then, the motor of the push button and zipper hook piece testing mechanism operates again, so that a push button poking block on the guide rods pushes the unlocking push button again; at this time, the zipper hook piece and the zipper heads are loosened, the zipper heads are disengaged from the luggage lock under the action of a sliding block return spring, and the elastic zipper sheet returns; meanwhile, the number-changing key is ejected, thereby completing one-time testing on four functions including testing on the push button, testing on the friction between the zipper hook piece and the zipper heads, testing on the elastic zipper sheet and testing on the number-changing key. Then, the first electric push rod moves to start performing next-time testing.

Namely, in the invention, testing on four functions including the service life of the push button, the elasticity and service life of the elastic zipper sheet, the sliding friction of the zipper hook piece and the service life of the number-changing key is completed on one device, thereby achieving complete intelligent control. The four functions can be tested sequentially every 4 seconds. Testing may include single-item testing and multi-item testing, and can be self-adjusted. The invention is adaptable to all luggage locks on the current market. Compared with the current manual testing efficiency, the testing efficiency is increased by 5 times, and the labour cost is reduced. Meanwhile, by means of a friendly human-computer interface, the device is easy to operate and use. An acousto-optic fault alarm function, a testing completion alarm function and a failure alarm function are provided.

To sum up, the invention has the following advantages: a manual testing mode of a worker can be replaced with the comprehensive testing machine, thereby greatly improving the testing efficiency and the testing accuracy; and meanwhile, testing of four functions including the service life of the push button, the elasticity and service life of the elastic zipper sheet, the sliding friction of the zipper hook piece and the service life of the number-changing key is creatively completed on one device, simulation of the working sequence and principle of the luggage lock under the using condition controlled by the PLC is achieved, and a completely-intelligent requirement is met.

What is claimed is:

1. A multifunctional comprehensive testing machine for a luggage lock, comprising a testing machine table and a control unit, wherein a luggage lock fixing clamp, a push button and zipper hook piece testing mechanism, an elastic zipper sheet testing mechanism and a number-changing key testing mechanism are installed on a working table top of the testing machine table;

the push button and zipper hook piece testing mechanism comprises an installation base plate, a motor, a cam driven by the motor, guide rods driven by a curved surface of the cam and a push button poking block installed at the tail ends of the guide rods, the motor, the cam, the guide rods and the push button poking block being installed on the installation base plate, the guide rods being installed on a guide rod seat, and a guide rod return spring being arranged at the periphery of each guide rod;

the elastic zipper sheet testing mechanism comprises a first installation support, a first electric push rod and a vertical sliding rail being vertically installed on the first installation support, a sliding block being installed on the vertical sliding rail, an output end of the first electric push rod directly facing an upper end surface of the sliding block, a sliding block return spring being arranged between the upper part of the sliding block and the installation support, and a zipper head locating block being installed on the sliding block; and the number-changing key testing mechanism comprises a second installation support and a second electric push rod installed thereon, an output end of the electric push rod being connected to a number-changing key ejector pin.

2. The multifunctional comprehensive testing machine for the luggage lock according to claim 1, wherein the push button and zipper hook piece testing mechanism comprises two push rods, a front guide rod connecting block and a rear guide rod connecting block being arranged at the front and rear ends of the two guide rods respectively, a roller being connected to the front guide rod connecting block, and the roller of the front guide rod connecting block being in contact with the cam; and the push button poking block is installed on the rear guide rod connecting block.

3. The multifunctional comprehensive testing machine for the luggage lock according to claim 1, further comprising a push button return sensor, a sliding block return sensor, an elastic zipper sheet return sensor and a number-changing key return sensor connected to the control unit.

4. The multifunctional comprehensive testing machine for the luggage lock according to claim 1, wherein a stroke switch is arranged beside the guide rods.

5. The multifunctional comprehensive testing machine for the luggage lock according to claim 1, wherein the control unit comprises a Programmable Logic Controller (PLC) arranged in the testing machine table, a touch display screen and a start-stop switch, the touch display screen and the start-stop switch being installed on the side of the machine table, and an alarm lamp being arranged on the side of the machine table.

6. The multifunctional comprehensive testing machine for the luggage lock according to claim 1, wherein two strip-shaped grooves configured to install zipper heads are provided on the zipper head locating block of the elastic zipper sheet testing mechanism.

7. The multifunctional comprehensive testing machine for the luggage lock according to claim 1, wherein a plurality of fixing holes are provided on the working table top of the testing machine table.

* * * * *